United States Patent

[11] 3,594,094

| | | |
|---|---|---|
| [72] | Inventors | Wilhelm Engelke;<br>Axel Remberg, both of Mulheim (Ruhr), Germany |
| [21] | Appl. No. | 881,442 |
| [22] | Filed | Dec. 2, 1969 |
| [45] | Patented | July 20, 1971 |
| [73] | Assignee | Siemens Aktiengesellschaft<br>Berlin and Munich, Germany |
| [32] | Priority | Dec. 3, 1968 |
| [33] | | Germany |
| [31] | | P 18 12 492.0 |

[54] SHAFT SEAL WITH AXIAL LABYRINTH FOR TURBOMACHINES
17 Claims, 7 Drawing Figs.

[52] U.S. Cl. ............................................. 415/111
[51] Int. Cl. ....................................... F01d 11/02
[50] Field of Search ........................................... 415/111

[56] References Cited
UNITED STATES PATENTS
2,858,975  11/1958  Feilden .................. 415/111

Primary Examiner—C. J. Husar
Attorneys—Curt M. Avery, Arthur E. Wilfond, Herbert L. Lerner and Daniel J. Tick ABSTRACT: Shaft seal for turbomachines includes a cylindrical shell having a diameter greater than the shaft, labyrinth seals axially disposable in the clearance between the shell and the shaft, and mounting means for holding the shell coaxially to the shaft formed of annular surfaces at the shell periphery extending perpendicularly to the shell axis and being retainable against stream pressure from an interior space of the turbomachine by corresponding surfaces formed on a surrounding part of the turbomachine, the shell surfaces being axially spaced from one another and having annular intermediate chambers located between successive sealing rings in the axial direction, the intermediate chambers being subjectible to pressure intermediate the pressures in the interior and exterior of the turbomachine for attaining a decreasing pressure staging from interior to exterior of the turbomachine, the labyrinth chambers of the labyrinth seals axially spaced a distance from the turbomachine interior corresponding to the distance of the intermediate chambers therefrom being connected by a pressure-equalizing channel to the respective intermediate chambers.

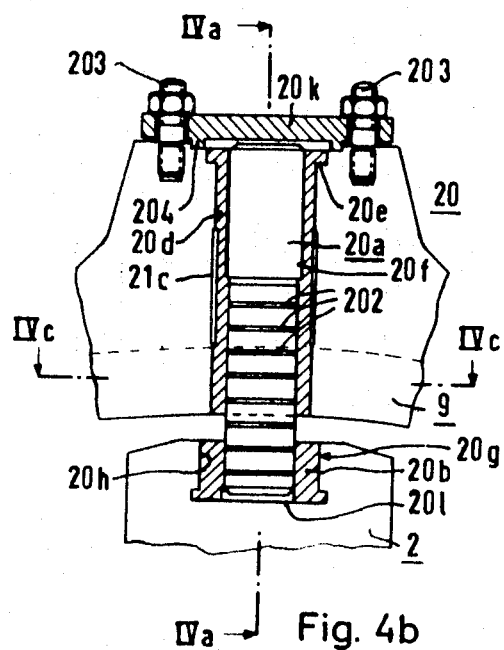
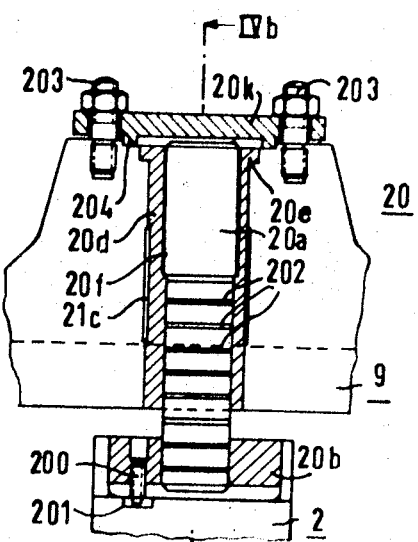
Fig. 4b    Fig. 4a
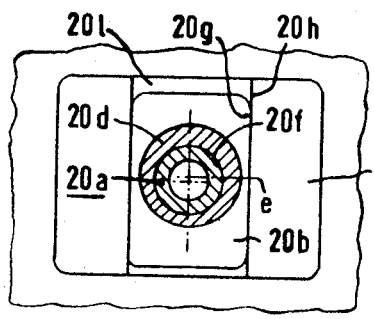
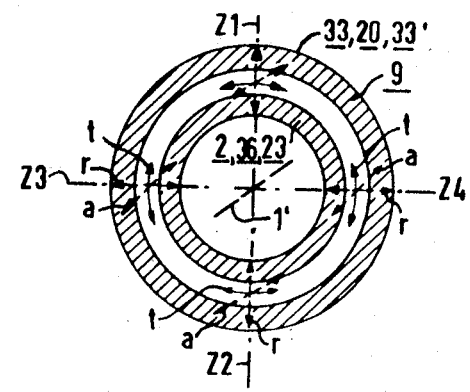
Fig. 4c    Fig. 4d

SHAFT SEAL WITH AXIAL LABYRINTH FOR TURBOMACHINES

Our invention relates to a shaft seal with axial labyrinth for turbomachines, preferably high-pressure steam turbines. More particularly, our invention relates to such shaft seal that includes a substantially cylindrical axially divided shell adapted to surround and be radially spaced from a shaft, labyrinth seals disposed in the radial space between the shell and the shaft, and mounting means for holding the shell at a part of the turbomachine housing surrounding the shell so that it is thermally displaceable concentric to the shaft, the mounting means comprising annular structural surfaces located at the periphery of the sealing shell and extending substantially perpendicularly to the axis of the shell, the structural surfaces being retainable against steam pressure from within the turbomachine by corresponding opposing surfaces formed on the surrounding part of the turbomachine housing.

In turbomachines, especially high-pressure steam turbines, there must be a reduction in the great pressure and temperature drop from the steam chamber to the exterior, for which purpose the shaft seal is of special importance. In this regard, it is known to provide shaft seals with radial labyrinths, because a great number of small labyrinth chambers can thereby be installed along a given axial length. Such radial labyrinth-chamber shaft seals are known, for example, from the German book "Die Dampfturbinen" by Zietemann, 1955, p.245, FIG. 280 and p.246, FIG. 281. On the other hand, it is also known from the same citation to provide valve seals with axial labyrinths instead of radial labyrinths; however, the axial length must generally then be increased if the same sealing effect as for the radial labyrinths is to be attained.

It is accordingly an object of our invention to provide shaft seal with axial labyrinths for turbomachines, preferably high-pressure steam turbines, that is much simplified with respect to manufacture as compared to a shaft seal with radial labyrinths, but which simultaneously affords the attainment of as good a sealing action as is attainable with shaft seals having radial labyrinths, without having to increase the axial length to any considerable degree. More specifically, it is an object of our invention to provide such shaft seal with axial labyrinths which will have such a good sealing action that the shaft seal may be employed for high-pressure steam turbines with guide vane carrier or rings wherein the entire pressure and temperature drop can act upon the shaft seal.

With the foregoing and other objects in view, we provide, in accordance with out invention, shaft seal with axial labyrinth for turbomachines comprising a substantially cylindrical axially divided shell adapted to surround and be radially spaced from the turbomachine shaft, labyrinth seals disposed in the radial space between the shell and the shaft, and mounting means for holding the shell at a part of the turbomachine housing surrounding the shaft so that the shell is concentrically heat transferable to the shaft, the mounting means comprising annular structural surfaces located at the periphery of the shell and extending substantially perpendicularly to the shell axis, the structural surfaces being retainable against steam pressure from the interior of the turbomachine by corresponding opposing surfaces formed on the surrounding part of the turbomachine, the structural surfaces of the mounting means being axially spaced from one another in a direction from the interior to the exterior of the turbomachine and having elastic sealing rings disposed in the spaces therebetween, and at least one annular intermediate chamber located between successive sealing rings in the axial direction of the shell, the intermediate chamber being subjectable to a pressure intermediate the pressures in the interior and exterior of the turbomachine, the labyrinth seals having labyrinth chambers axially spaced from the interior of the turbomachine a distance corresponding to the distance of the intermediate chamber therefrom being connected by a pressure-equalizing channel to the intermediate chamber.

In accordance with another feature of the invention, we provide the shaft seal for turbomachines with a plurality of intermediate chambers located between successive sealing rings in the axial direction of the shell, the intermediate chamber being subjectable successively from the interior to the exterior of the turbomachine to ever decreasing pressures intermediate the pressures in the interior and the exterior of the turbomachine, the intermediate chambers being connected by respective pressure-equalizing channels to respective labyrinth chambers of the labyrinth seals axially spaced from the turbomachine interior a distance corresponding to the distance of the respective intermediate chamber therefrom, the respective sealing rings having an elastic constant or stiffness that is greater, the greater the pressure difference to which they are subjected.

In accordance with further features of our invention, the spring stiffness of the elastic sealing rings and, therewith, the axial length of the series of labyrinth seals associated therewith and the respective pressure differences in axial direction from the interior to the exterior of the turbomachine (in the direction of decreasing pressure drops) are reduced. Toward the end of the turbomachine housing and of the sealing shell, the pressure and temperature load decreases so that sealing of the flange and shaft is readily possible thereat.

In accordance with another feature of our invention, the elastic sealing rings are provided with a U-shaped cross section and are received in the respective annular gaps formed between the structural surfaces of the turbomachine housing part, the sealing rings being disposed with the respective bases thereof at the outer periphery of the sealing shell and with both elastically deformable legs thereof at the structural and opposing surfaces, respectively and, in radial direction between the sealing ring and the surrounding turbine housing, an annular gap section remains for affording radial thermal expansion. Such U-shaped sealing rings are relatively simple to manufacture, are readily insertable and provide a reliable seal with the legs thereof.

In accordance with yet another feature of our invention, the sealing shell is formed at the outer periphery thereof with annular shoulders stepwise reduced so that the annular shoulders and the sealing rings and opposing surfaces associated therewith are located at diameters of the shell, reducing in the decreasing direction of the pressure drop. Thereby, at the location at the higher pressure and temperature level there is a greater cross section available for sealing and absorbing the pressure load. In accordance with an added feature of the invention, moreover, the turbomachine housing part surrounding the sealing shell and located in the axial region of the sealing shell corresponding to the structural surface staging, is formed with substantially conical wall portions tapering toward the end of the housing.

According to an additional feature and preferred embodiment of our invention, the aforedescribed shaft seal is employed with a steam turbine having a pot housing. It is thereby possible to locate the joint flange that extends perpendicularly to the axis of the shaft, at the out-flow or "cold" end of the guide vane ring or the inner housing shell. According to the invention, therefore, the shaft seal serves for sealing the pot housing inflow part of the turbine, the sealing shell and the pot housing being stepwise reduced in diameter in the axial engagement regions thereof so that the shaft with the sealing shell superimposed thereon, is axially insertable into the inflow part of the pot housing. This principle is also basically realizable for the out-flow part of the pot housing, namely in the form wherein the shaft seal is inserted between the out-flow part of the pot housing and the shaft, the sealing shell and the out-flow part of the pot housing being reduced stepwise in the axial engagement region thereof in such a way that the out-flow part of the pot housing (the housing cover) is able to be placed over the shaft provided with the sealing shell on the flange that extends perpendicularly to the axis of the shaft.

Further in accordance with out invention and especially in the case where the shaft seal is employed with a steam turbine of the superpressure type, we provide a labyrinth system of a pressure equalizing piston disposed on a larger diameter portion of the shaft and a labyrinth system of a shaft seal located axially adjacent thereto in the direction of decrease in pressure drop on a smaller diameter portion of the shaft, the steps at the inner and outer peripheries of the sealing shell being fitted to one another so as to form substantially similar housing wall thicknesses.

Other features which are considered as characteristic for the invention are set forth in the appended claims.

Although the invention is illustrated and described herein as embodied in shaft seal with axial labyrinth for turbomachines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which:

FIG. 4a is a fragmentary much-enlarged view of FIG. 1 showing the centering pin assembly enclosed in the broken circle A;

FIG. 4b is a sectional view of FIG. 4a taken along the line IVb–IVb in the direction of the arrows;

FIG. 4c is a cross-sectional view of FIG. 4b taken along the line IVc–IVc in the direction of the arrows; and FIG. 4d is a schematic view illustrating the principle of the centering pin assembly in a radial centering plane.

Figure 1:
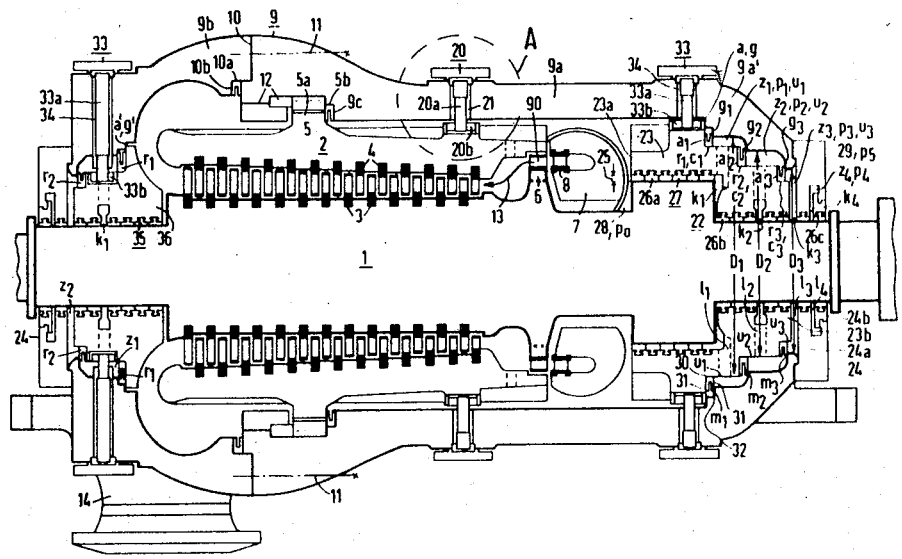
FIG. 1 is a diagrammatic longitudinal sectional view of a high-pressure partial turbine of the superpressure type, having at the left-hand and right-hand sides thereof (the influx and efflux ends thereof, respectively), the shaft seal according to out invention.

Referring now to the drawing, and first particularly, to FIG. 1 thereof, there is shown a high-pressure partial turbine of the reaction type, made up of a shaft 1, a reaction blade system 2 with a moving blade ring 3 and a guide vane ring 4, the latter being carried by a guide vane carrier or ring and/or inner housing (inner shell) 5. The turbine is provided with an equal pressure-control stage 6 with live steam inlets 7, nozzle segments 8 and runner blades 90. A pot-shaped outer housing 9 encloses the turbine and is provided with a flange 10, extending perpendicularly to the axis of the turbine. The housing 9 is formed of a housing portion 9a at the inflowing side of the turbine and a cover-shaped housing portion 9b at the outflowing side of the turbine, the housing portions 9a and 9b having a steamtight connection to one another at the flange 10, the location of the nonillustrated flange bolts being represented by the dot-dash lines 11. Within the housing 9, the inner housing shell 5 is braced steamtightly with the annular collar 5a thereof, with the insertion of an elastic sealing ring 5b, against a housing shoulder 9c by means of ring parts 12 fastened formlockingly within the housing 9. An elastic sealing ring 10a is similarly inserted in a corresponding annular groove 10b for sealing the flange 10. The in-flowing steam from the live steam inlets 7 flows in the direction of the arrow 13, initially through the control stage 6 and thereafter through the blade system 34 and, after leaving the latter, through exhaust lines 14 to a nonillustrated intermediate superheater or a succeeding turbine stage. Centering assemblies 20 are provided for heat transferably mounting the inner shell or housing 5 axially and radially centrally within the housing 9. The centering assemblies 20 are formed of radial bolts 20a mounted in housing bores 21 and provided with sliding blocks 20b at the ends thereof. The bolts 20a, by being eccentrically mounted, are adjustable not only radially but also axially and in the peripheral direction of the housing. The inner shell or housing 5 is suspended from the sliding blocks 20 b so as to be displaceable in axial direction as is described more fully hereinafter with regard to FIGS. 4a to 4d.

For a clear understanding of our invention, attention will be directed initially to the shaft seal 22 at the inflowing side of the turbine shown in FIG. 1. The shaft seal 22 is formed of a substantially cylindrical inner sealing shell 23 and an outer sealing cover 24. The sealing shell 23 is divided axially and is radially spaced from the shaft 1 by a cylindrical gap 25 in which axial labyrinth seals 26a and 26b are disposed on respectively greater and lesser diameter portions of the shaft 1. Likewise, axial labyrinth seals 26c are disposed in the radial gap 25 between the cover 24 and the shaft 1. Such axial labyrinths 26 have sealing elements (sealing points, sealing combs or annular grooves) which are carried by labyrinth rings that are divided in peripheral direction and are disposed at the inner periphery thereof, these sealing elements being in cooperation with corresponding sealing elements at the outer periphery of the shaft 1 and forming therewith succeeding labyrinth chambers in the axial direction. The labyrinth chambers and sealing elements are not further illustrated or described since they are well known in the art. The sealing shell 23 is axially divided and held centrally heat movable relative to the shaft 1 at the turbine housing parts 9a surrounding the sealing shell 23, the sealing shell being provided at the outer periphery thereof with circular ring-shaped structural surfaces extending perpendicularly to the shell axis and held by corresponding circular ring-shaped opposing surfaces of the turbine housing part 9a against inner steam pressure. In particular, the sealing shell 23 with the circular ring-shaped structural surface 1a, is held axially fixed and radially centrally heat movable to the corresponding opposing surface $g$ of the turbine housing part 9a. Furthermore, between the annular surfaces $a_1$, $a_2$, $a_3$, which are axially spaced from one another, and the corresponding opposing surfaces $g_1$, $g_2$, $g_3$ of the turbine housing part 9a, elastic sealing rings $r_1$, $r_2$, $r_3$ are inserted. Annular intermediate chambers $z_1$ and $z_2$ at respective intermediate pressures $p_1$ and $p_2$ are located between the axially succeeding elastic sealing rings $r_1$, $r_2$, $r_3$ and serve for attaining a decreasing pressure staging in direction from the interior space 28 at a pressure $p_0$ to the exterior space 29 at a pressure $p_3$. The respective intermediate chamber $z_1$ and $z_2$ is connected through pressure equalizing channels $1_1$ and $1_2$ to an intermediate pressure of respective labyrinth intermediate chambers $k_1$ and $k_2$, corresponding to the axial distance thereof from the interior chamber 28. The elastic constants or stiffness $c_1$, $c_2$, $c_3$ of the individual elastic sealing rings $r_1$, $r_2$, $r_3$ are greater the greater the pressure difference $p_0$ minus $p_1$, $p_1$ minus $p_2$, $p_2$ minus $p_3$, respectively, applied thereto. It is especially advantageous when the elastic constants or stiffnesses of the elastic sealing rings and, herewith, the axial length of the respective labyrinth seal sections 26 and the pressure differences associated therewith, decrease in the direction from the interior space 28 to the exterior space 29, i.e. reducing pressure drops. Such proportioning or design is provided in the illustrated embodiment of FIG. 1. Thus, $p_0 > p_1 > p_2 > p_3$ within the respective intermediate chambers $z_1$, $z_2$, $z_3$; furthermore, the pressure differences are purposely selected so that $(p_0 - p_1) > (p_1 - p_2) > (p_2 - p_3)$ and correspondingly, the spring constant or stiffness of the elastic sealing rings $r_1$ to $r_3$ is selected so that $c_1 > c_2 > c_3$.

The elastic sealing rings $r_1$, $r_2$, $r_3$, as shown in FIG. 1, preferably have a U-shaped cross section and are inserted in the annular gaps $m_1$ to $m_3$ respectively between the annular surfaces $a_1$ to $a_3$ of the sealing shell or housing 23 and the opposing surfaces $g_1$ to $g_3$ of the turbine housing part 9a so that the sealing rings $r_1$ to $r_3$ engage with the base 30 thereof the outer periphery of the sealing shell 23 and with both elastically deformable legs 31 thereof the structural and opposing surfaces $a_n$ and $g_n$ ($n = 1, 2, 3$) respectively, and an annular gap section 32 which affords radial thermal expansion remains located in the radial direction between sealing ring $r_n$ and turbine housing $9a$. Additional advantageous features are that the sealing shell 23 at the outer periphery thereof is formed with annular shoulders $a_1, a_2, a_3$ which are reduced in diameter by the steps $u_1, u_2, u_3$ so that the annular shoulders $a_n$, the sealing rings $r_n$ and opposing surfaces $g_n$ relating thereto are disposed on portions of the shaft 1 having reduced diameters $D_1, D_2, D_3$ in the direction of decreasing pressure drop. Accordingly, the turbine housing shell $9a$ surrounding the sealing shell 23 is provided in the axial region of the sealing shell 23 with conical wall portions tapering toward the end of the housing. In the embodiment of FIG. 1 illustrating a steam turbine of the reaction type, an especially desirable sealing system is provided in that the shaft seal 22 has a labyrinth system $26a$ of a pressure equalizing piston disposed on a portion of the shaft 1 of relatively large diameter and a labyrinth system $26b$ of the shaft seal proper located axially adjacent thereto and in a direction of decreasing pressure drop on a portion of the shaft 1 having a relatively smaller diameter, the steps at the inner and outer peripheries of the sealing shell 23 being accommodated to one another by the formation of substantially similar housing wall thicknesses as illustrated. The one structural surface $a$ with the opposing surface $g$ serve practically as a benchmark or set point for the axial expansion of the sealing shell 23, the latter being freely expansible with both ends $23a$ and $23b$ thereof in both axial directions. Radial pins or bolts $23a$ with eccentrically bored bushings and slide blocks or rings $33b$ are provided for axially and radially central heat displaceably mounting the sealing shell 23, whereby an adjustment of the sealing shell 23 is afforded in radial direction. This centering device 33, 34 as well as the centering device for sealing shell 36 are constructed in a manner generally similar to the centering device 20, 21, being provided with a centering element $33a$ and a bore 34 formed in the respective housing portion $9a$ or $9b$. Further description of these centering devices is provided hereinafter with regard to FIGS. $4a$ to $4d$. A further improvement in the shaft seal 22 is achieved by providing a sealing cover 24, so as to form an additional intermediate chamber, seated on an end flange $9c$ of the turbine housing 9 after the annular space $z_3$, subjected to an intermediate pressure $p_3$, following the last sealing ring $r_3$ in the direction of decreasing pressure drop. The sealing cover 24 is axially divided and, advantageously as for the sealing housing 33, forms an additional labyrinth seal section $26c$ with the shaft 1. The intermediate chamber $z_3$, and the labyrinth intermediate chamber $k_3$ are connected by a pressure equalizing channel $l_3$. Within the sealing cover 24 there is provided an additional chamber system formed of an intermediate chamber $z_4$ and a labyrinth intermediate chamber $k_4$ connected by a pressure equalizing channel $l_4$, these spaces being further connected to an intermediate exhaust, not shown in the drawing. The chamber system $z_4, l_4$, which is at a pressure $p_4$, is formed of a base member $24a$ of the sealing cover 24 and an insert portion $24b$ form-lockingly inserted therein. On the inflowing end of the turbine of FIG. 1 an effective pressure and temperature reduction is produced through the shaft seal 22 over the intermediate chambers $z_1$ to $z_4$ with the elastic sealing rings $r_1$ to $r_3$ and the respective labyrinth seal sections $26a$ to $26c$ to the exterior of the turbine. The sealing cover 24 has another advantage in that after disassembly thereof the outer end of the sealing shell 23 is accessible from the outside and can be inspected or centered. The sealing shell 23 and the pot housing in-flow portion $9a'$ are stepwise reduced in the axial engagement region thereof as illustrated, so that the shaft 1, with the sealing shell 23 installed thereon, can be axially inserted into the pot housing in-flow portion $9a'$. The shaft seal 22 is provided with two intermediate chambers $z_1$ and $z_2$ between three successive elastic sealing rings $r_1$ to $r_3$. This provides a very desirable construction for the in-flow side of the high-pressure turbine, however our invention is not limited thereto because the number of intermediate chambers and elastic sealing rings can be varied in accordance with the respective structure of the sealing shell.

A possible variation of this structure for the left-hand side, e.i. the out-flow side $9b$, of the turbine is illustrated by the shaft seal 35. Those parts of the shaft seal 35 which correspond to the shaft seal 22 at the in-flow side of the turbine are represented by the same reference numerals. In the shaft seal 35, an intermediate chamber $z_1$ is disposed between two successive elastic sealing rings $r_1$ and $r_2$; the next succeeding intermediate chamber $z_2$ is disposed between the sealing shell 36 and the sealing cover 24. In all other respects, the structure of the shaft seal 35 corresponds substantially to that of the shaft seal 22. It is readily apparent that the shaft seal 35 is inserted and disposed between the pot housing out-flow portion $9b$ and the shaft 1 so that the sealing shell 36 and the pot housing out-flow portion $9b$ engage one another stepwise in the axial engagement region thereof, and the pot housing out-flow portion $9b$ is able to be placed over the shaft 1 provided with the sealing shell 36 on the flange 10 which is disposed perpendicularly to the axis of the shaft 1. The shaft 1 and the shaft seals 32 and 35 therefor are capable of being inserted relatively easily into the pot housing 9. The annular structural or abutting surfaces $a'$ and the opposing surfaces $g'$ at the outflow end of the turbine serve for providing an axially fixed and radially centered heat displaceable installation.

Figure 2:
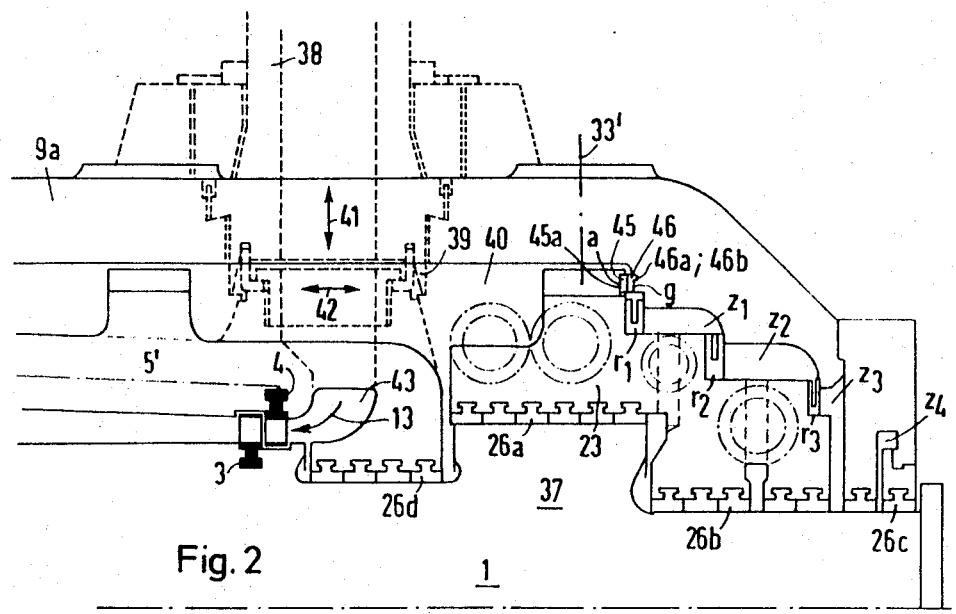
FIG. 2 is another embodiment of FIG. 1 showing only the upper right-hand end portion thereof slightly enlarged.

In FIG. 2 there is shown another embodiment of the shaft seal which is installed in the in-flow end of a high-pressure turbine of the reaction type having an outer housing 9 and an inner housing $5'$. The shaft seal 37 of the embodiment of FIG. 2 is provided with elements similar to those of the shaft seal 22 of FIG. 1 and accordingly identified by the same reference numerals. It is readily apparent that the tubular live steam inlet 38 passes through the outer housing 9 and is connected with the inner housing $5'$ through an angle ring joint 39 so that a stem tight connection to the housing chamber 40 is attained at this joint, and relative motion in the axial direction and in the radial direction, as represented by the respective arrows 41 and 42, is afforded between the steam inlet 38 and the inner housing $5'$. A control stage is not provided in the embodiment of in-flow but rather the steam passes in the direction of the arrow 13 directly into the blade system 3, 4 of the turbine. The inflow space 43 is sealed through an additional labyrinth seal section $26d$, which is inserted between the inner housing $5'$ and a shaft 1, with respect to the housing chamber 40. The centering with radial pins or bolts as in the embodiment of FIG. 2 is indicated at the sealing shell 23 only by the dot-dash line $33'$ in FIG. 2. It may also be clearly noted that between the structural surface $a$ and the opposing surface $g$, two annular parts 45 and 46 are disposed which afford sliding in radial direction. The annular portion 46 is suspended with extensions $46a$ in a corresponding annular groove $46b$ formed in the outer housing 9 while the annular portion 45 is inserted in an annular groove $45a$ formed in the sealing shell 23. The embodiment of FIG. 2 is otherwise constructed as shown in the right-hand portion of FIG. 1.

Figure 3:
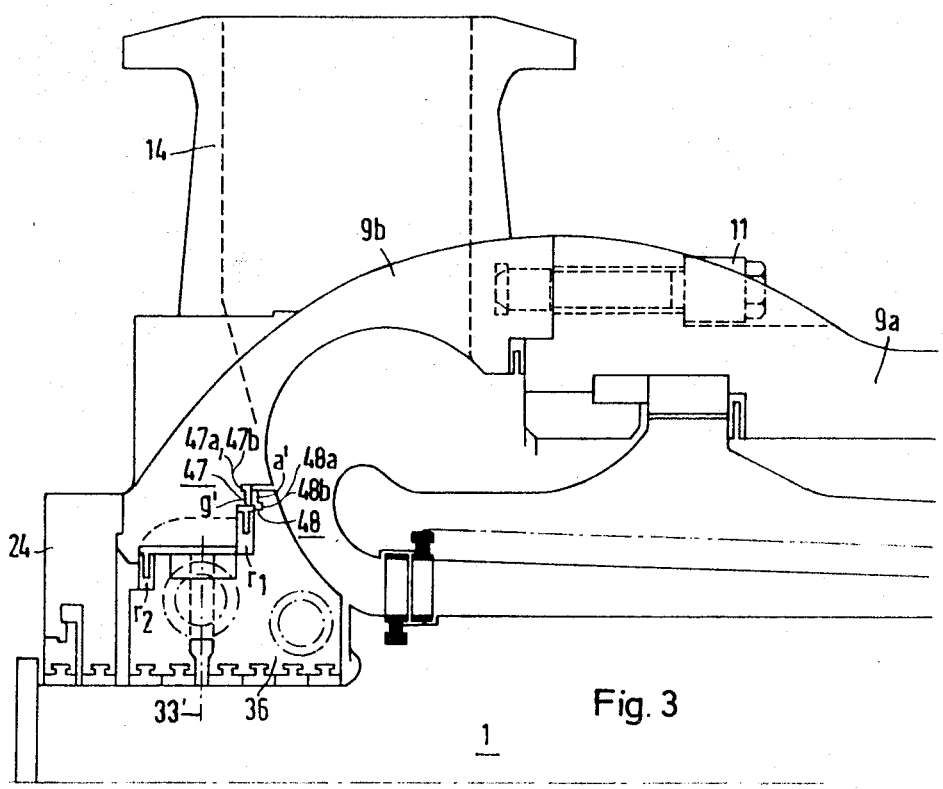
FIG. 3 shows the upper left-hand end portion of the embodiment of FIG. 2.

Structural features shown in FIG. 3 and corresponding to those shown in FIG. 2 are identified by the same reference numerals. In FIG. 3, the left-hand end of the embodiment of FIG. 2 is illustrated so as to clearly show the arrangement and construction of the structural surfaces $a'$ of the sealing shell 36 in connection with the opposing surfaces $g'$ of the turbine housing part $9b$, wherein annular portions 47 and 48 with respective extensions $47a$ and $48a$ are disposed in corresponding annular grooves $47b$ and $48b$ formed in the housing part $9b$ and the sealing shell 36 respectively. As seen, an axially fixed, however radially central heat displaceable, mounting is afforded by means of the rings 47 and 48 which serve as sliding members.

In FIG. $4d$ there is illustrated the principle of radial pin centering in a schematic and perspective view between a generally identified inner shell 2 and a generally identified outer housing 9. The rotary axis of the turbine is identified by the reference character $1'$. As indicated, four suspension or centering points Z1, Z2, Z3, and Z4 are provided per centering plane, each of the centering points being afforded a relative displacement of both housing parts 2 and 9 with respect to one another in the peripheral direction as indicated by the double headed arrows $t$, in the radial direction as indicated by the doubleeheaded arrows $r$ and in the axial direction as indicated by the double headed arrows $a$. Of the just-mentioned arrows, the arrows $t$ are shown respectively extended to imply that they relate to an adjustment in the peripheral direction at assembly, which is a fixed adjustment, while the broken arrows $a$ and $r$ are meant to imply that a radially central heat transferable relative displacement, due to dissimilar thermal expansions between the inner housing 4 on the one hand and the outer housing 12 on the other hand is possible in axial and radial direction during the operation of the turbine. The use of the reference characters 33, 20, 33' is meant to bring out that the aforedescribed centering principle is applicable for the centering pin devices 33, 20 of FIG. 1 as well as for the nonillustrated but diagrammatically indicated centering pin devices 33' of FIGS. 2 and 3. Accordingly, the inner shell is identified by reference numerals 2, 23, 36 which are applicable in the hereinafter following description of FIGS. 4a to 4c for all of the aforementioned centering pin devices.

As is shown in FIGS. 4a to 4c in detail, the outer housing 9 is formed with a radial bore 21 wherein a cylindrical bushing 20d formed with a flange 20e is inserted. The bushing 20d is provided with an eccentric bore 20f whose eccentricity $e$ is clearly shown in FIG. 4c. The hollow cylindrical centering pin or bolt 20a is inserted in this eccentric bore 20f, and the lower end of the eccentric pin 20a is fitted in a sliding block or ring or an adjusting spring 20b. The sliding ring 20b is slidingly guided in the axial direction with sliding surfaces 20g thereof extending in the axial direction of the turbine against corresponding opposing surfaces 20h of longitudinal grooves 20 l formed in the inner shell 2. In order that the slide blocks or rings 20b be prevented from slipping within the broad surfaces 20h of the inner shell 2 when the respective centering pin device is installed, they are secured with a set screw 200 (FIG. 4a) within a recess 201 formed in the inner housing 2 so that, as shown, adequate clearance for movement of the respective slide blocks or rings 20b in the axial direction is provided. The radial pins or bolts 20a are provided at their outer periphery with grooves 202 through which a possible wear or binding between the parts 20a and 20d which are radially displaceable relative to one another can be suppressed. A cover 20k is tightly fastened by bolts 203 from the outside on the outer housing 9 to seal the housing bore 21 and is pressed by an annular bead 204 formed thereon against corresponding opposing surfaces formed on the outer housing 9. As shown in FIGS. 4a and 4b, relative motion in the radial direction between the radial pins 20a and bushings 20d as well as between the pins 20a and the sliding blocks or rings 20b in radial direction is afforded as represented by the arrows $r$ of FIG. 4d. Furthermore, relative motion in axial direction between the sliding blocks or rings 20b and the respective opposing surfaces 20h at the inner housing 2 is afforded in a direction of the arrow $a$, as shown in FIG. 4d. The adjustment, i.e. the centering, of the inner shell 2 with respect to the outer housing 9 is effected, with the covers 20k removed, by turning the respective bushings 20d in their bore 21. When the foregoing measures are carried out in all four centering points Z1 to Z4 of a centering plane (FIG. 4d), all desired relative positions of the inner shell 2 with respect to the outer housing 9 can then be attained within the desired adjustment limits, i.e. a raising or lowering or a lateral displacement or a rotation in the peripheral direction of the inner shell 2 relative to the outer housing 9. Accordingly, the sealing shells 23 and 36 are also adjustable and are mounted so as to be axially as well as radially central heat transferable.

In summary, the primary advantages of our invention are as follows:

a. reliable control of the pressure drop from the steam chamber to the exterior space for high-pressure steam turbines when employing axial labyrinths, b. the sealing shells are capable of being produced in one casting with axial joints and a plurality of intermediate chambers, whereby the support at the turbine housing is simplified, c. relatively good insertability of the sealing shell together with the shaft into a pot housing in-flow portion or a pot housing out-flow portion due to a relatively easy step construction of the sealing shell and the housing, d. realization of the building block principle by standardization of the sealing shells, the elastic sealing rings and the labyrinth rings due to the limitation thereof to only a few basic types, and e. reducing the production time by greatly simplified fabrication methods.

We claim:

1. Shaft seal for turbomachines comprising a substantially cylindrical axially divided shell adapted to surround and be radially spaced from the turbomachine shaft, axially extending labyrinth seals disposed in the radial space between said shell and said shaft and mounting means for holding said shell at a part of the turbomachine housing surrounding said shaft so that said shell is thermally displaceable concentrically to the shaft, said mounting means comprising annular structural surface means located at the periphery of said shell and extending substantially perpendicularly to the axis of said shell, said structural surface means being retainable against steam pressure from within the turbomachine by corresponding surface means formed on the surrounding part of the turbomachine housing, the structural surface means of said mounting means being axially spaced from one another in a direction from the interior to the exterior of the turbomachine and having elastic sealing rings disposed in the spaces therebetween, and at least one annular intermediate chamber located between successive sealing rings in axial direction of said shell, said intermediate chamber being subjectable to a pressure intermediate the pressures in the interior and exterior of the turbomachine for attaining a decreasing pressure staging from the interior to the exterior of the turbomachine, said labyrinth seals having labyrinth chambers, the labyrinth chambers axially spaced from the interior of the turbomachine a distance corresponding to the spacing of said intermediate chamber therefrom being connected by a pressure-equalizing channel to said intermediate chamber.

2. Shaft seal according to claim 1, comprising a plurality of intermediate chambers located between successive sealing rings in axial direction of said shell, said intermediate chambers being subjectable successively from the interior to the exterior of the turbomachine to ever decreasing pressures intermediate the pressures in the interior and the exterior of the turbomachine, said intermediate chambers being connected by respective pressure-equalizing channels to respective labyrinth chambers of said labyrinth seals axially spaced from the turbomachine interior a distance corresponding to the distance of the respective intermediate chambers therefrom, the respective sealing rings having an elastic constant that is greater, the greater the pressure difference to which they are subjected.

3. Shaft seal, according to claim 2, wherein said elastic constant of said sealing rings and, therewith, the axial length of a respective series of said labyrinth seals associated therewith and said respective pressure differences in axial direction from the interior to the exterior of the turbomachine in direction of decreasing pressure drop, decrease.

4. Shaft seal according to claim 2, wherein said elastic sealing rings are formed with a substantially U-shaped cross section and are received in respective annular gaps formed between said structural surface means of said sealing shell and said corresponding surface means of the turbomachine housing part, said sealing rings being disposed with the respective base portions thereof at the outer periphery of said sealing shell and with both elastically deformable leg portions thereof at said structural surface means and said corresponding surface means, respectively, and an annular gap section remaining in radial direction between said sealing rings and the surrounding turbine house for affording radial thermal expansion.

5. Shaft seal according to claim 2, wherein said sealing shell is formed at the outer periphery thereof with annular shoulders stepwise reduced in axial direction so that said annular shoulders and said sealing rings and corresponding surface means are located at axial portions of said shell having diameters reducing in direction of pressure drop decrease.

6. Shaft seal according to claim 5, wherein the housing part of the turbomachine surrounding said sealing shell and located in axial region of said sealing shell corresponding to said structure surface means is formed with substantially conical wall portions toward the end of the housing.

7. Shaft seal according to claim 2, wherein the turbomachine is a steam turbine having a pot housing.

8. Shaft seal according to claim 7, for sealing the inflow side of the pot housing, said sealing shell and pot housing being stepwise reduced in diameter in the axial engaging regions thereof so that the shaft with said sealing shell placed thereon, is insertable in the in-flow side of the pot housing.

9. Shaft seal according to claim 7, wherein the shaft seal is insertable between the out-flow side of the pot housing and the shaft, said sealing shell and the out-flow side of the pot housing being reduced stepwise in the axial engagement region thereof so that the out-flow part of the pot housing is placeable over the shaft provided with said sealing shell on said flange extending perpendicularly to the axis of the shaft.

10. Shaft seal according to claim 8, wherein the steam turbine is of the reaction type, including a labyrinth system of a pressure equalizing piston disposed on a larger diameter portion of the shaft and a labyrinth system of the shaft seal located axially adjacent thereto in direction of pressure drop reduction on a smaller diameter portion of the shaft, the steps at the inner and outer peripheries of said sealing shell being fitted to one another so as to form substantially similar housing wall thicknesses.

11. Shaft seal according to claim 2, wherein a corresponding surface means serves as bench mark for axial expansion of said sealing shell, the latter being mounted with both ends thereof being freely displaceable in both axial directions, and including radially extending pins received in eccentrically bored bushings and provided with slide rings at an end thereof for radially and axially centrally head displaceably mounting said sealing shell, said pins and slide rings being actuable for adjusting said sealing shell in radial direction.

12. Shaft seal according to claim 7, including a sealing cover disposed on an end flange of the turbine housing at a location after an annular chamber following the last sealing ring in direction of pressure drop decrease so as to form an additional intermediate chamber, said sealing cover being axially divided and forming with the shaft an additional section of labyrinth seals.

13. Shaft seal according to claim 12, wherein said sealing cover is provided with an inner annular channel system, and including intermediate exhaust means, said inner annular channel system forming a connection between an intermediate stage of said additional section of labyrinth seals and said intermediate exhaust means.

14. Shaft seal according to claim 13, wherein said sealing cover is provided with a base member, and an insert portion is form-lockingly received in said base member, said annular channel system being formed between said base member and said insert portion.

15 Shaft seal according to claim 2, wherein said labyrinth seals form with the shaft within said radial space an axial succession of said labyrinth chambers and including peripherally divided labyrinth rings mounted at the inner periphery of said sealing shell and serving as carrier for sealing elements cooperating corresponding sealing elements located at the outer periphery of the shaft.

16. Shaft seal according to claim 2, wherein two intermediate chambers are located between three successive elastic sealing rings.

17. Shaft seal according to claim 2, wherein one intermediate chamber is located between two successive elastic sealing rings.